US012623731B2

(12) United States Patent
Schmitz

(10) Patent No.: US 12,623,731 B2
(45) Date of Patent: May 12, 2026

(54) DEVICE FOR PIVOTABLY CONNECTING AN AIR-GUIDING ELEMENT TO A VEHICLE

(71) Applicant: MAN Truck & Bus SE, Munich (DE)

(72) Inventor: Andreas Schmitz, Munich (DE)

(73) Assignee: MAN Truck & Bus SE, Munich (DE)

( * ) Notice: Subject to any disclaimer, the term of this patent is extended or adjusted under 35 U.S.C. 154(b) by 1014 days.

(21) Appl. No.: 18/019,724

(22) PCT Filed: Jul. 8, 2020

(86) PCT No.: PCT/EP2020/069241
§ 371 (c)(1),
(2) Date: Feb. 3, 2023

(87) PCT Pub. No.: WO2021/008968
PCT Pub. Date: Jan. 21, 2021

(65) Prior Publication Data
US 2024/0010282 A1    Jan. 11, 2024

(30) Foreign Application Priority Data

Jul. 16, 2019    (DE) ..................... 10 2019 004 968.3

(51) Int. Cl.
*B62D 35/00*          (2006.01)
(52) U.S. Cl.
CPC .................................. *B62D 35/001* (2013.01)
(58) Field of Classification Search
CPC ................ B62D 35/001; B62D 49/005; B60Y 2200/148
See application file for complete search history.

(56) References Cited

U.S. PATENT DOCUMENTS

| | | | |
|---|---|---|---|
| 4,736,490 A | 4/1988 | Wesselski | |
| 6,886,882 B2 * | 5/2005 | Farlow ................ | B62D 35/001 |
| | | | 296/180.1 |
| 8,403,401 B2 | 3/2013 | Rinehart et al. | |

(Continued)

FOREIGN PATENT DOCUMENTS

| | | |
|---|---|---|
| CA | 2990648 A1 | 7/2018 |
| CN | 202148751 | 2/2012 |

(Continued)

OTHER PUBLICATIONS

The First Office Action issued in Chinese Patent Application No. 202080044277.8 dated Dec. 29, 2023 with English translation.

(Continued)

*Primary Examiner* — Lori Lyjak
(74) *Attorney, Agent, or Firm* — Weber Rosselli & Cannon LLP

(57) ABSTRACT

The invention relates, amongst other things, to a device for pivotably connecting an air-guiding element (16), preferably a rear side-air-guiding element of a drivers cab, to a vehicle (10), preferably a rear wall of the drivers cab of a utility vehicle. The device has a swing hinge (22), which is designed to be fastened on the one hand to the air-guiding element (16) and on the other hand to the vehicle (10). The swing hinge (22) has a locking mechanism (32), which is designed to lock the swing hinge (22) automatically when at least one predetermined pivot position has been reached.

26 Claims, 6 Drawing Sheets

10

(56)  References Cited

U.S. PATENT DOCUMENTS

Figures 1, 2:
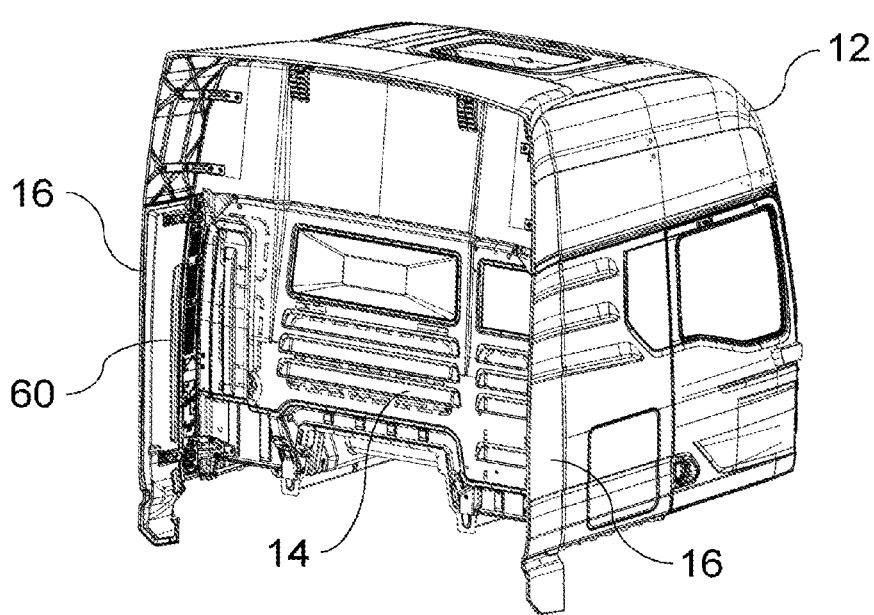

| | | |
|---|---|---|
| 2003/0227194 A1 | 12/2003 | Farlow et al. |
| 2008/0047100 A1 | 2/2008 | Gitnes |
| 2010/0201153 A1 | 8/2010 | Pesotini, Jr. |
| 2011/0042998 A1* | 2/2011 | Rinehart .............. B62D 35/001 |
| | | 296/180.3 |
| 2015/0197292 A1 | 7/2015 | Smith et al. |

FOREIGN PATENT DOCUMENTS

| | | |
|---|---|---|
| CN | 102159786 B | 10/2014 |
| DE | 2614010 A1 | 10/1977 |
| DE | 102012015997 A1 | 1/2013 |
| DE | 102012002092 A1 | 8/2013 |
| DE | 102014016899 | 8/2015 |
| EP | 0005358 B1 | 10/1981 |
| EP | 3205562 B1 | 8/2019 |
| GB | 1138890 A | 1/1969 |
| GB | 2146597 B | 1/1987 |
| GB | 2497211 A * | 6/2013 .......... B62D 35/001 |
| RU | 2573529 | 1/2016 |
| WO | 2013178365 A1 | 12/2013 |

OTHER PUBLICATIONS

Decision to Grant issued in Russian Patent Application No. 2021137342/11(078544) dated Nov. 17, 2023 with English translation through Google translate.

German Search Report issued in German Patent Application No. 102019004968.3 dated Dec. 12, 2020. English translation not available.

International Search Report and Written Opinion issued in PCT/EP2020/069241 dated Oct. 9, 2020 with English translation.

Brazilian office action issued in Brazilian Patent Application No. BR112021026141-9 dated Apr. 15, 2024 with English translation.

Korean Office Action issued in Korean Application No. 10-2022-7001098 dated Sep. 26, 2025 with English translation.

* cited by examiner

DEVICE FOR PIVOTABLY CONNECTING AN AIR-GUIDING ELEMENT TO A VEHICLE

CROSS-REFERENCE TO RELATED APPLICATIONS

This application is a 371 application of PCT/EP2020/069241 filed Jul. 8, 2020, which claims benefit of and priority to German Patent Application Serial No. DE102019004968.3 filed Jul. 16, 2019, the disclosures of the above-identified applications are hereby incorporated by reference in their entirety.

The invention relates to a device for pivotably connecting an air-guiding element, preferably a rear-side air-guiding element of a driver's cab, to a vehicle, preferably a rear wall of the driver's cab of a utility vehicle.

Trucks can be partially equipped with wind or air-guiding elements. The air-guiding elements are intended to improve the aerodynamics between the tractor unit and the semi-trailer. In particular, there are side air-guiding elements (so-called side panels or side flaps) for this purpose. The side air-guiding elements are attached to a rear wall of the driver's cab and can at least partially close or bridge a region between the driver's cab and the semi-trailer. The side air-guiding elements can generally be arranged so as to be pivotable about a vertical axis at least on one side (drivers side or passengers side). This allows access to the rear wall of the driver's cab, for example in order to be able to connect and disconnect a media supply for the semi-trailer or to be able to carry out certain maintenance work.

Various types of pivotable connections have been developed for the side air-guiding elements. These include a pivoting outward via a parallelogram, a pivoting outward via a rotary axis, and a pivoting inward via a rotary axis.

Document U.S. Pat. No. 8,403,401 B2 discloses an adjustable air-deflecting panel for mounting on a vehicle. At least one panel and a plurality of brackets for fastening the panel to the vehicle are included. Each bracket comprises a vehicle bracket portion for fastening to the vehicle and a panel bracket portion for fastening the panel to the vehicle bracket portion. The bracket portions are pivotably coupled to each other in order to thereby pivotably connect the panel to the vehicle. The vehicle bracket portion comprises a first engagement element, and the panel bracket portion comprises a second engagement element. The engagement elements are designed to engage with each other when the engagement elements are clamped together, thereby preventing the panel from pivoting about the rotation axis and with respect to the vehicle.

The invention is based on the problem of creating an alternative and/or improved attachment for the side air-guiding elements.

The problem is solved by the features of independent claim 1. Advantageous refinements are given in the dependent claims and the description.

The invention provides a device for pivotably connecting a preferably flat air-guiding element (for example, spoiler element), preferably a side air-guiding element at the rear side of the drivers cab, to a vehicle, preferably a rear wall of the drivers cab of a utility vehicle. The device comprises a pivot hinge, which is designed on the one hand to be fastened (for example, directly or indirectly) to the air-guiding element and on the other hand to be fastened (for example, directly or indirectly) to the vehicle. The pivot hinge comprises a locking mechanism which is designed to lock the pivot hinge automatically when at least one predetermined pivot position (preferably at least two predetermined pivot positions) has been reached.

The device can offer the advantage that the locking mechanism automatically applies a locking force (for example, mechanical or magnetic) which holds the pivot hinge in the predetermined pivot position. Thus, a pivot mechanism that is as simple as possible for the user can be realized, for example, without extra actuation by a lever, etc. The automatic locking mechanism can include a feedback that is haptically and/or acoustically perceptible for the user, so that the user can be sure that the air-guiding element has been locked. The device gets by with few large components and can thus provide a cost and weight advantage over current series solutions.

In one exemplary embodiment, the locking mechanism is integrated into the pivot hinge. This means, for example, that no separate locking mechanism needs to be provided. Installation space can be saved.

In another exemplary embodiment, the locking mechanism is arranged coaxially about a pivot axis of the pivot hinge. In this way, the locking mechanism can protect the pivot axis from corrosion, for example.

In a further exemplary embodiment, a pivot axis of the pivot hinge is fully encapsulated or sealed, wherein particularly preferably the locking mechanism partially encapsulates or seals the pivot axis (for example, by enwrapping a lateral surface of the pivot axis). Alternatively or additionally, the locking mechanism of the pivot hinge can be fully encapsulated or sealed. For example, this can reduce corrosion and extend maintenance intervals.

In one embodiment, the locking mechanism is formed as a latching mechanism.

In a further refinement, the latching mechanism is designed to be at least double-acting, so that the pivot hinge is lockable in the at least one predetermined pivot position in each case by at least two latching engagements or movable latching elements. In this way, for example, large loads can be withstood even in a small installation space.

In a further embodiment, the latching mechanism comprises a spring, preferably a helical spring (for example, helical compression spring), for biasing the latching mechanism in the at least one predetermined pivot position. Preferably, the spring can bring about or at least assist the autonomy of the locking action. Preferably, the spring can coaxially surround a pivot axis of the pivot hinge. Advantageously, the required installation space can thus be reduced.

In a further embodiment, the latching mechanism comprises a, for example, fixed first latching element, preferably formed as a (for example, outer) latching bushing, and a, for example, movable (for example, rotatable) second latching element, preferably formed as a (for example, inner) latching bushing, for engagement with one another.

In a further refinement, the latching mechanism can comprise a, for example, fixed third latching element, which is preferably formed as a (for example, outer) latching bushing, and a, for example, movable (for example, rotatable) fourth latching element, which is preferably formed as a (for example, inner) latching bushing, for engagement with one another. Thus, for example, the latching mechanism can be of a double-acting design.

For example, the first latching element and/or the third latching element can be fixed in a hinge bracket of the pivot hinge, for example in a manner fixed against rotation.

In one variant, the latching elements are arranged coaxially with respect to one another and/or the latching elements coaxially surround a pivot axis of the pivot hinge and/or the latching elements coaxially surround a spring, preferably a helical spring (for example, helical compression spring). It is also possible that a bushing region of the pivot hinge, preferably of a pivot arm of the pivot hinge, coaxially surrounds the latching elements. This can, for example, reduce a required installation space and/or contribute to a protective encapsulation.

In a further variant, the second latching element and the fourth latching element are elastically supported against each other, preferably by means of a spring.

In one exemplary embodiment, the first latching element and the third latching element are formed as identical parts. Alternatively or additionally, the second latching element and the fourth latching element are formed as identical parts. Preferably, this allows the manufacturing costs to be reduced and incorrect assembly to be prevented.

In another exemplary embodiment, the pivot hinge comprises a hinge bracket for fastening to the vehicle and a pivot arm pivotable relative thereto for fastening to the air-guiding element. Preferably, the hinge bracket can support the pivot arm on an upper side and/or a lower side of the pivot arm. Alternatively or additionally, the locking mechanism can be configured, for example, such that the pivot arm does not perform an axial movement along a pivot axis of the pivot hinge during the locking process. This can also prevent axial movement of the air-guiding element during the locking process.

In one embodiment, the pivot hinge comprises an adjustment device, preferably comprising a rotatable pressure spindle, for precision adjustment of a pivot arm of the pivot hinge, preferably in a predetermined pivot position. For example, a gap dimension between the vehicle and the air-guiding element can be precision-adjusted in the pivoted-out position.

In a further embodiment, the at least one predetermined pivot position has a predetermined pivoted-out position of the pivot hinge and/or a predetermined pivoted-in position of the pivot hinge. Preferably, the pivoted-out position and the pivoted-in position can be spaced apart from one another by an angle of at least 40°, 50°, 60°, 70°, 80°, 90° or 100° with respect to a pivot axis of the pivot hinge (for example, approximately 100°).

In one variant, the device comprises a plurality of (for example, two) pivot hinges provided with the locking mechanism for fastening the air-guiding element to the vehicle in a spaced-apart manner, preferably in a longitudinal direction of the air-guiding element.

The invention also relates to an air-guiding device for a motor vehicle, preferably a utility vehicle. The device comprises an air-guiding element, preferably a side air-guiding element at the rear side of the driver's cab. The device additionally comprises a pivotal connection device as disclosed herein. The pivot hinge is fastened to the air-guiding element, preferably an inner side of the air-guiding element. For example, the air-guiding element can be pivotable inwardly by means of the pivot hinge from a pivoted-out position in which the air-guiding element is substantially flush with the vehicle.

Preferably, the air-guiding element can be designed as a substantially strip-shaped, vertically oriented and/or flat panel or spoiler, preferably made of plastic or sheet metal.

In one exemplary embodiment, the air-guiding element comprises a handle portion, preferably comprising a handle recess, which is arranged, preferably integrated, on an inner side and/or an outer side of the air-guiding element. The handle portion can be used, for example, to ascend onto or descend from the work platform behind the drivers cab more easily when the air-guiding element is folded in.

In a refinement, the handle portion is oriented parallel to a pivot axis of the at least one pivot hinge.

In another exemplary embodiment, the handle portion extends over at least a quarter, a third, a half, or two-thirds of the height of the air-guiding element and/or over a length of at least cm, 50 cm, 60 cm, 70 cm, or 80 cm in a use position of the air-guiding element. Further, the handle portion can also extend over the entire length of the air-guiding element. Thus, the handle portion can be safely used for both ascending and descending.

The invention also relates to a motor vehicle, preferably a utility vehicle (for example, truck preferably with a loading structure or tractor unit preferably with a semi-trailer). The motor vehicle comprises a device for pivotable connection or air guidance as disclosed herein.

It is also possible, for example, to use the device as disclosed herein for passenger vehicles or off-road vehicles.

Figure 3:
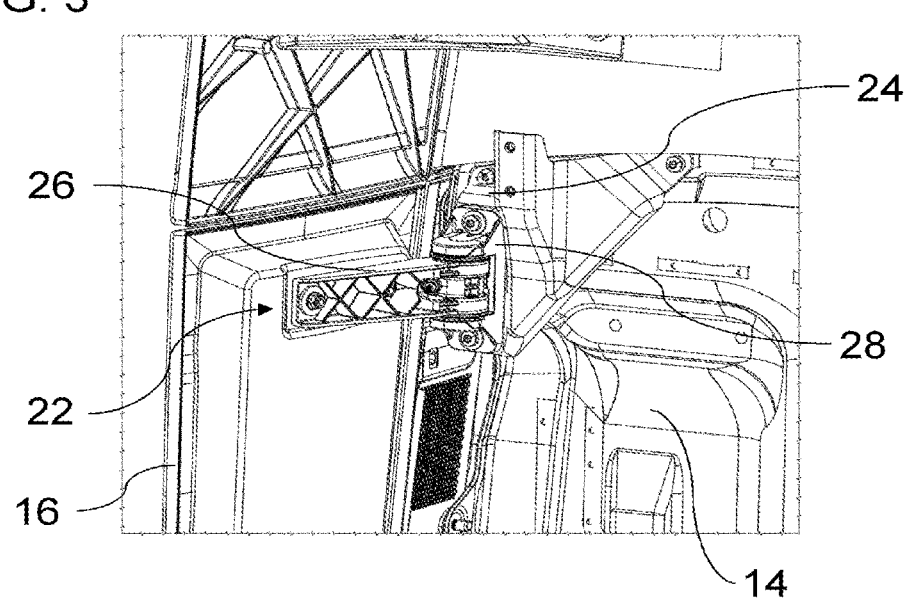
Figure 4:
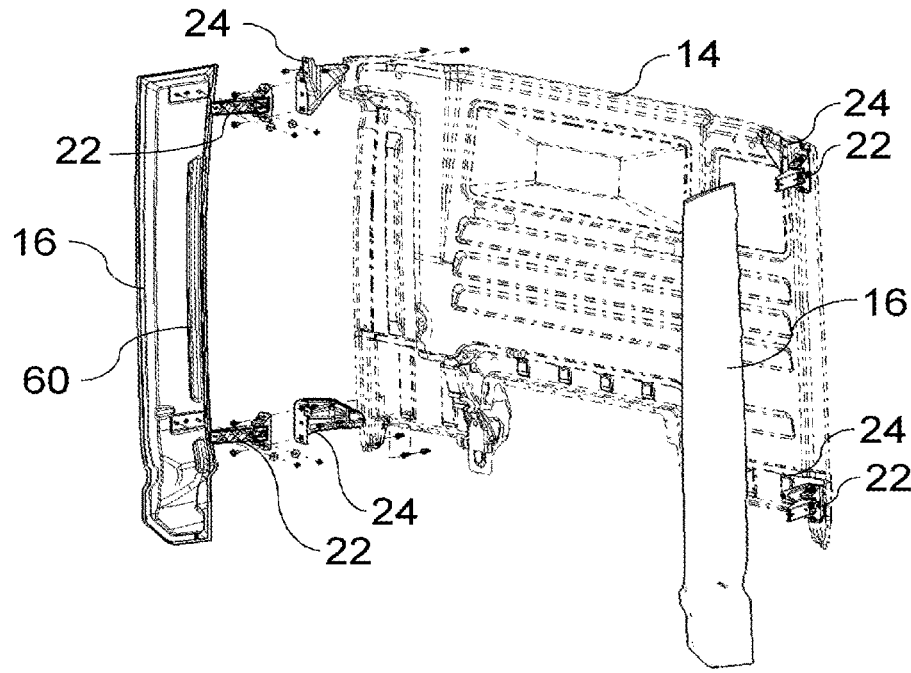
Figure 5:
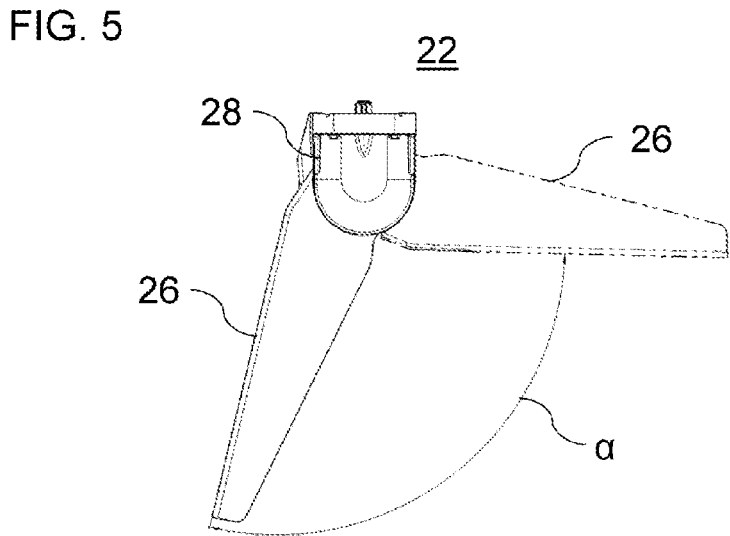
Figure 6:
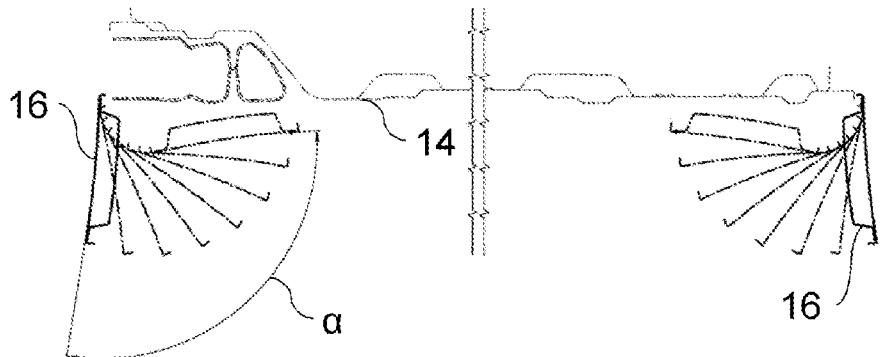
Figure 7:
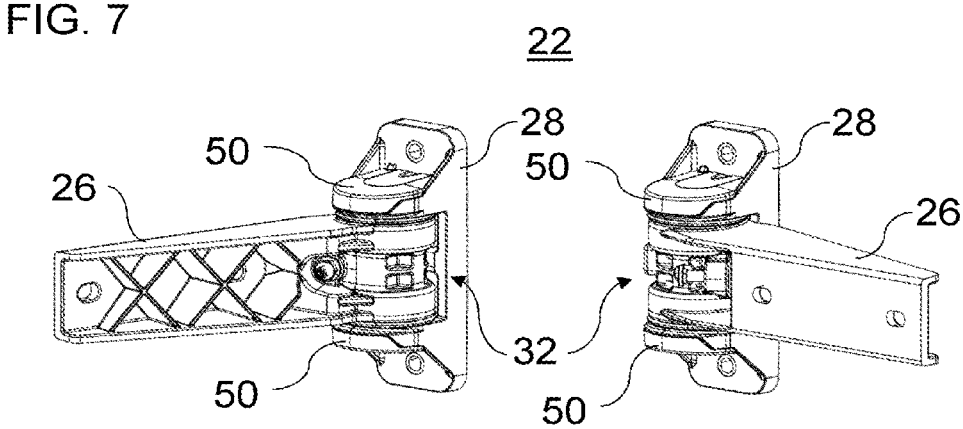
Figure 8:
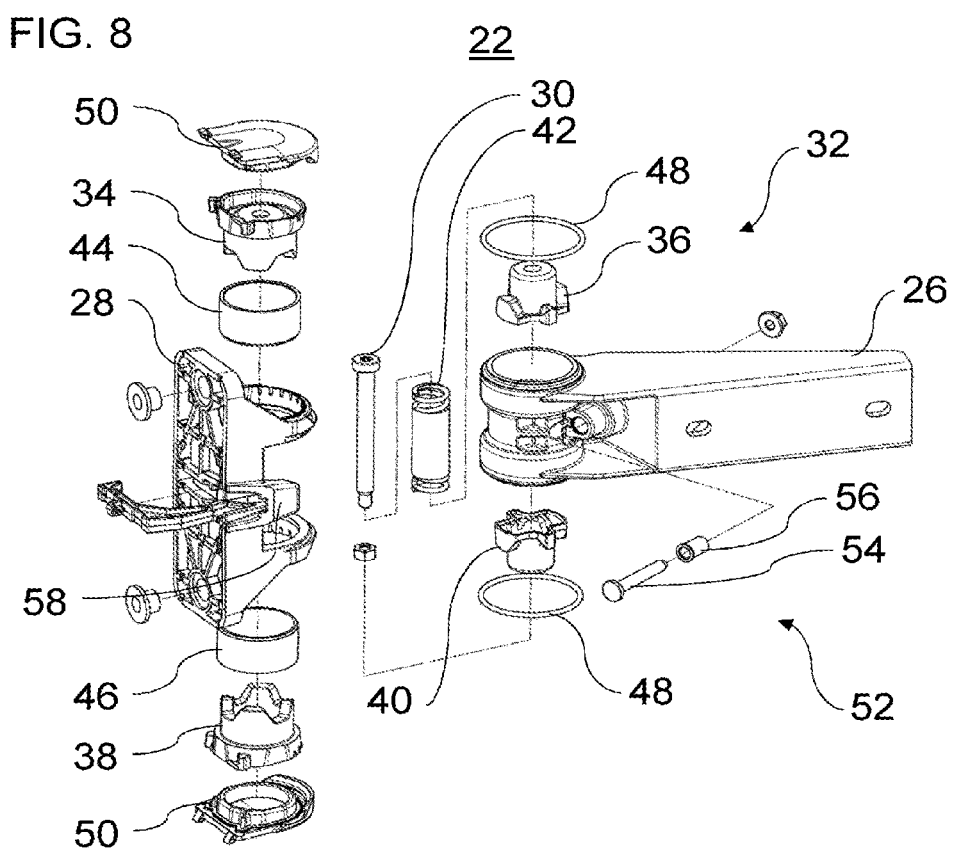
Figure 9:
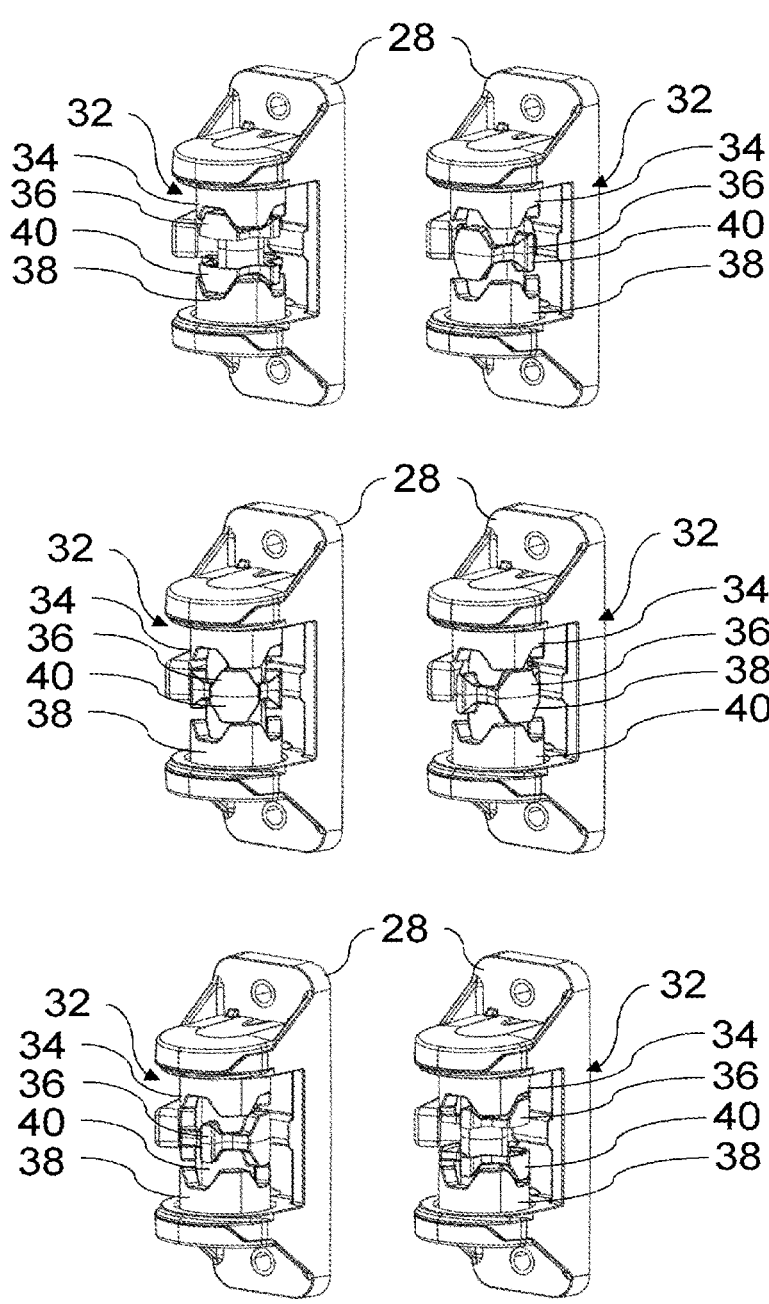
Figure 10:
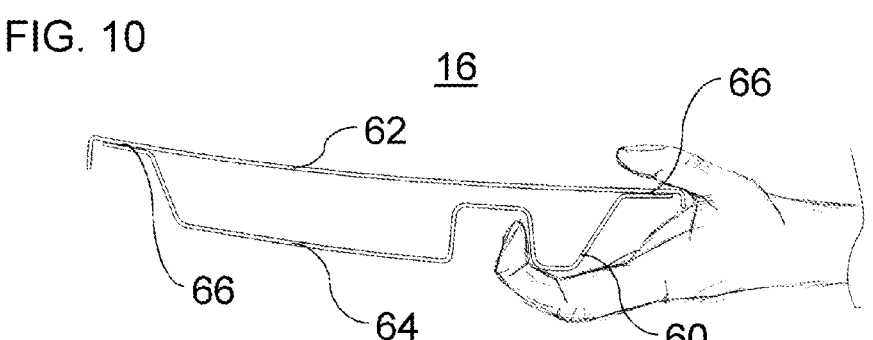
Figure 11:
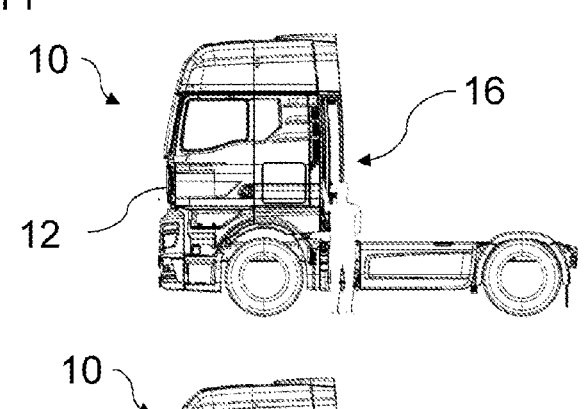
Figure 11:
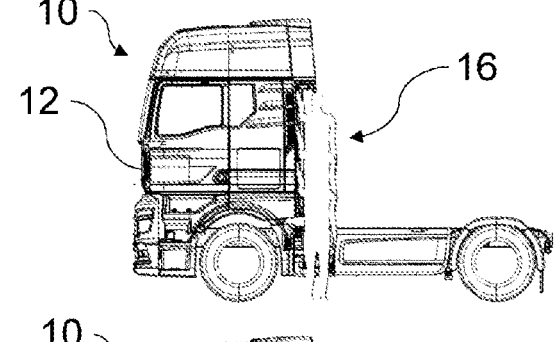
Figure 11:
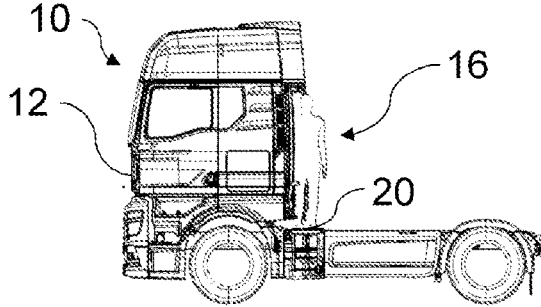

The preferred embodiments and features of the invention described above can be combined with each other in any desired manner. Further details and advantages of the invention are described below with reference to the accompanying drawings, which show:

FIG. 1 a perspective side view of a motor vehicle according to an exemplary embodiment of the present disclosure;

FIG. 2 a perspective rear view of a drivers cab of the exemplary motor vehicle;

FIG. 3 a detailed perspective view of a portion of a rear wall of the exemplary drivers cab;

FIG. 4 an assembly drawing or exploded view showing the rear wall of a driver's cab, pivot hinges and side air-guiding elements;

FIG. 5 a plan view of an exemplary pivot hinge in a pivoted-out position and a pivoted-in position;

FIG. 6 a schematic horizontal sectional view through the rear wall of a driver's cab and in front of side air-guiding elements that are pivotable on both sides;

FIG. 7 the exemplary pivot hinge in a pivoted-out position and the exemplary pivot hinge in a pivoted-in position;

FIG. 8 an assembly drawing or exploded view of the pivot hinge;

FIG. 9 various positions of an exemplary latching mechanism for the pivot hinge;

FIG. 10 a horizontal sectional view through an exemplary side air-guiding element showing a handle portion and a hand engaging the handle portion; and FIG. 11 a schematic illustration showing an ascent and descent onto/from a work platform of the motor vehicle at the rear side of a driver's cab.

The embodiments shown in the figures correspond at least in part, so that similar or identical parts are provided with the same reference signs and reference is also made to the description of the other embodiments or figures for their explanation in order to avoid repetitions.

FIG. 1 shows a motor vehicle 10. The motor vehicle 10 is preferably designed as a tractor unit for towing an attachable semi-trailer or as a truck with a loading structure. However, it is also possible to advantageously use the techniques disclosed herein for pivotably attaching an air-guiding element to other vehicles, for example, passenger vehicles or utility vehicles, trailers and/or semi-trailers.

With reference to FIGS. 1 and 2, the motor vehicle 10 has a drivers compartment or driver's cab 12 with a rear wall 14. Two side air-guiding elements 16 are arranged on the rear wall 14 to improve aerodynamics. One of the side air-guiding elements 16 is arranged on a drivers side, and the other side air-guiding element 16 is arranged on a passengers side. For example, the side air-guiding elements 16 are designed as substantially strip-shaped, vertically oriented and/or flat panels or spoilers preferably made of plastic or sheet metal.

Both side air-guiding elements 16 can be connected to the rear wall 14 so as to be pivotable in and out. The side air-guiding elements 16 can be pivoted out to extend a side wall of the driver's cab 12 substantially flush against a forward direction of travel of the motor vehicle 10 to improve aerodynamics. The side air-guiding elements 16 can be pivoted in to provide access to the rear wall 14 and to the media supply 18 for the semi-trailer, particularly with the semi-trailer in the coupled state. For example, a person can also ascend onto a narrow work platform 20 behind the rear wall 14 when the corresponding side air-guiding element 16 is pivoted in.

It is also possible for only one of the two side air-guiding elements 16 to be pivotably connected to the rear wall 14 and for the other side air-guiding element 16 to be fixedly connected to the rear wall 14, for example.

FIGS. 2 to 4 show the pivotable attachment of the side air-guiding elements 16 to the rear wall 14 in greater detail. The pivotable connection comprises two pivot hinges 22 for each side air-guiding element 16.

The pivot hinges 22 are expediently arranged vertically spaced apart. The pivot hinges 22 are preferably fastened to an inner side of the relevant side air-guiding element 16, for example detachably, preferably by means of a screw connection. Preferably, a pivot arm 26 of the pivot hinge 22 can be fastened to the side air-guiding element 16 (see, for example, FIG. 3). The pivot arm 26 is pivotably connected to a hinge bracket 28 of the pivot hinge 22. A first pivot hinge 22 is fastened to an upper region of the side air-guiding element 16. A second pivot hinge 22 is fastened to a lower region of the side air-guiding element 16. The pivot axes of the first and second pivot hinges 22 are aligned with each other.

The pivot hinges 22 are each fastened indirectly to the rear wall 14 via a tie bracket 24, for example detachably, preferably by means of a screw connection. Direct fastening to the rear wall 14 is also possible. Preferably, the hinge bracket 28 of the pivot hinge 22 can be fastened to the tether bracket 24 or to the rear wall 14 (see, for example, FIG. 3). The first pivot hinge 22 is attached to an upper region of the rear wall 14 on the driver's or passenger's side. The second pivot hinge 22 is fastened to a lower region of the rear wall 14 on the drivers side or passengers side.

FIGS. 5 and 6 show a pivot range of the pivot hinges 22 and the associated side air-guiding elements 16, respectively.

The pivot arm 26 is pivotable between the pivoted-out position (solid line in FIG. 5) and the pivoted-in position (dotted line in FIG. 5). The pivoted-out position and the pivoted-in position can enclose an angle α with respect to a pivot axis of the pivot hinge 22. In the illustrated exemplary embodiment, the angle α is approximately 100°. It is also possible for the angle α to be smaller or larger, for example, at least 40°, 50°, 60°, 70°, 80°, 90°, 100° or 110°. Preferably, the pivot hinge 22 can be automatically lockable in the pivoted-out position and/or the pivoted-in position and/or any intermediate position between the pivoted-out position and the pivoted-in position. The pivoted-out position and the pivoted-in position can additionally be limited, for example, by corresponding stops.

FIGS. 7 and 8 illustrate a preferred exemplary embodiment of the pivot hinge 22 in greater detail.

The pivot hinge 22 expediently comprises the pivot arm 26, the hinge bracket 28, a pivot axis and a locking mechanism 32.

The pivot axis 30 pivotably connects the pivot arm 26 to the hinge bracket 28. The pivot axis can expediently be a cylindrical bolt, pin, or peg.

The locking mechanism 32 serves to automatically lock the pivot hinge 22 in at least one predetermined pivot position, preferably both the pivoted-out position and the pivoted-in position. For this purpose, the locking mechanism 32 can be formed in any manner. The locking mechanism 32 automatically applies a locking force that holds the pivot hinge 22 in the at least one predetermined pivot position. To pivot the pivot hinge 22, this locking force must first be overcome. The locking force can be applied, for example, magnetically or preferably mechanically. A particularly preferred exemplary embodiment of the locking mechanism 32 is described below, in which the locking mechanism 32 is designed as a mechanical latching mechanism.

The locking mechanism 32 comprises four latching elements 34, 36, 38, 40 and a spring 42. Preferably, the latching elements 34, 36, 38, 40 are designed as latching bushings. Expediently, the latching bushings have latching projections and/or latching recesses at mutually facing, in particular end-face, regions. The pivot axis 30 and the locking mechanism 32, in particular the four latching elements 34, 36, 38, 40 as well as the spring 42, are preferably arranged coaxially to each other.

A first latching element 34 is fixed with respect to the hinge bracket 28. Preferably, the first latching element 34 is held non-rotatably in a first (for example, upper) annular region of the hinge bracket 28. For example, the first latching element 34 comprises at least one projection on an outer lateral surface, which projection can engage in at least one recess on an inner lateral surface of the first annular region of the hinge bracket 28.

A second latching element 36 is non-rotatably fixed with respect to the pivot arm 26. The second latching element 36 is arranged in a protected manner within a bushing region of the pivot arm 26. The second latching element 36 is directly opposite the first latching element 34. The second latching element 36 is guided in a plain bearing bushing 44. The plain bearing bushing 44 coaxially surrounds the first latching element 34 and the second latching element 36. The second latching element 36 is rotatable with respect to the first latching element 34 and the hinge bracket 28. The second latching element 36 is elastically supported on the spring 42. The spring 42 biases the second latching element 36 in a direction toward the first latching element 34, i.e., preferably in a vertical direction upwards. Depending on the rotational position, the second latching element 36 can engage with the first latching element 34 to latch or lock the pivot hinge 22.

A third latching element 38 is fixed with respect to the hinge bracket 28. Preferably, the third latching element 38 is held non-rotatably in a second (for example, lower) annular region of the hinge bracket 28. For example, the second latching element 38 comprises at least one projection on an outer lateral surface, which projection can engage in at least one recess on an inner lateral surface of the second annular region of the hinge bracket 28.

A fourth latching element 40 is fixed against rotation with respect to the pivot arm 26. The fourth latching element 40 is arranged in a protected manner within a bushing region of the pivot arm 26. The fourth latching element 40 is directly opposite the third latching element 38. The fourth latching element 40 is guided in a plain bearing bushing 46. The plain bearing bushing 46 coaxially surrounds the third latching element 38 and the fourth latching element 40. The fourth latching element 40 is rotatable with respect to the third latching element 38 and the hinge bracket 28. The fourth latching element 40 is elastically supported on the spring 42. The spring 42 biases the fourth latching element 40 in a direction toward the third latching element 38, i.e., preferably in a vertical direction upwards. Expediently, the spring 42 supports the second latching element 36 and the fourth latching element 40 against each other. Depending on the rotational position, the fourth latching element 40 can engage the third latching element 38 to latch or lock the pivot hinge 22.

The first and second latching elements 34 and 36 and the third and fourth latching elements 38 and 40 are configured to engage with one another in the at least one predetermined pivot position of the pivot hinge 22 under the action of the spring 42 to latch the pivot hinge 22. The at least one predetermined pivot position is predetermined by the design and arrangement of the latching projections and latching recesses of the latching elements 34, 36, 38, 40.

The latching elements 34, 36, 38, 40 each expediently have a central through-hole. The pivot axis 30 extends through the through-holes. The first and second latching elements 34, 36 preferably surround the pivot axis 30 in an upper region of the pivot axis 30. The third and fourth latching elements 34, 36 preferably surround the pivot axis 30 in a lower region of the pivot axis 30. A head of the pivot axis 30 can rest on an opening of the through-hole of the first latching element 34. By means of a screw, an opposite end of the pivot axis 30 can be axially secured to the third latching element 38. The bushing portion of the pivot arm 26 coaxially surrounds the latching elements 34, 36, 38, 40.

The spring 42 coaxially surrounds the pivot axis 30. Preferably, the spring 42 is designed as a helical compression spring. The spring 42 can be coaxially surrounded by the second latching element 36 and the fourth latching element 40.

In the exemplary embodiment shown, the latching mechanism is double-acting. In the at least one predetermined pivot position, not only do the latching elements 34, 36 engage with one another, but the latching elements 38 and 40 also engage with one another. However, it is also possible, for example, to provide the latching mechanism to be only single-acting with, for example, only two latching elements that can engage with each other. Accordingly, it is possible for the latching mechanism to comprise, for example, only the first and second latching elements 34 and 36.

The pivot hinge 22 can further comprise seals 48, for example ring seals, preferably O-rings. The seals 48 can each seal a gap between the bushing region of the pivot arm 26 and the annular regions of the hinge bracket 2. A cover 50, for example a lid, can be connected, preferably fitted, to the first latching element 34 from above and another cover 50, for example a lid, can be connected, preferably fitted, to the third latching element 38 from below. Thus, the pivot axis 30 and the locking mechanism 32 can be fully encapsulated. Corrosion and maintenance can thus at least be reduced.

The first latching element 34 and the third latching element 38 can be designed as identical parts. The second latching element 36 and the fourth latching element 40 can be designed as identical parts. The covers 50, the seals 48 and the plain bearing bushings 44, 46 can each also be designed as identical parts.

It is possible that the pivot hinge 22 comprises an adjustment device 52. The adjustment device 52 comprises a screw or pressure spindle 54. The pressure spindle 54 can be screwed into and out of a threaded bushing 56. The threaded bushing 56 is fixedly connected to the pivot arm 26. The adjustment device 52 additionally comprises a stop 58 for a head of the pressure spindle 54. The stop 58 is arranged on the hinge bracket 28. By screwing the pressure spindle 54 in or out, a positioning of the pivot arm 26 in the pivoted-out position (and thus of the side air-guiding element 16) can be precision-adjusted. This can be used, for example, to precisionadjust a gap dimension between the driver's cab 12 and the side air-guiding element 16 (see, for example, FIGS. 1 and 2).

With reference to FIG. 9, the operating principle of the exemplary locking mechanism 32 is described below. The pivot arm 26 is not shown, so as to make the operating principle visible. The position of the locking mechanism 32 in the top left illustration of FIG. 9 shows a first locking position of the locking mechanism 32, for example, corresponding to the pivoted-out position of the pivot hinge 22. The position of the locking mechanism 32 in the bottom right illustration of FIG. 9 shows a second locking position of the locking mechanism 32, for example, corresponding to the pivoted-in position of the pivot hinge 22. The other arrangements show a behavior of the locking mechanism 32 when transferring from the first locking position to the second locking position (sequence: top row>middle row>bottom row).

In the first locking position (top left illustration), the first latching element 34 and the second latching element 36 are engaged with each other. The spring 42 presses an expediently trapezoidal latching projection of the second latching element 36 into an expediently trapezoidal latching recess of the first latching element 34. In addition, the third latching element 38 and the fourth latching element 40 are engaged with each other. The spring 42 presses an expediently trapezoidal latching projection of the fourth latching element 40 into an expediently trapezoidal latching recess of the third latching element 38.

The top right illustration in FIG. 9 shows that, when the pivot arm 26 is rotated, the second latching element 36 is pushed inwardly by the first latching element 34 against the spring force. Similarly, the fourth latching element 40 is pushed inwardly by the third latching element 38 against the spring force. The axial movement of the latching elements 36, 40 is brought about by flanks of the latching projections and/or the latching recesses sliding against one another, preferably at an angle.

The illustrations in the middle row in FIG. 9 show how the compressed latching elements 36, pass the latching projections of the respective opposite latching elements 34, 38 when the pivot arm 26 is rotated. The illustrations in the last row of FIG. 9 show how the latching projections of the latching elements 36, 40 finally reach latching recesses of the second locking position and latch into these under the action of the spring bias.

The pivot hinge 22 thus enables no force to be applied in the lateral direction to the side air-guiding element 16 during the locking process, for example by a gas spring or a tension spring, but only in the axial direction of the pivot hinge 22 itself. The pivot arm 26 of the pivot hinge 22 (and thus the side air-guiding element 16) does not make any movement in the axial direction during the locking process, but the internal latching elements 36, 40 move against or with the spring bias by the spring 42.

The locking mechanism 32 can allow a haptically perceptible (and possibly acoustically audible) locking action. This results in a clear feedback to the operator that the side air-guiding element 16 is locked in place. The pivoting of the side air-guiding element 16 occurs constantly over the path and only has to be brought out of the locking position by a certain actuating force. At the end of the travel, the locking mechanism locks itself again automatically via the spring 42. An advantage here is that the side air-guiding element 16 does not make part of the travel by itself and does not jump towards or away from the operator.

Likewise, the design of the pivot hinge 22 provides the possibility of optimally adjusting the operating forces. To adjust the operating forces, for example, the flank angles or flank sizes of the latching projections and/or the latching recesses of the latching elements 34, 36, 38, 40 or the spring force can be varied. By changing the latching elements 34, 36, 38, 40, other lockable pivot angles can also be realized.

Although a particularly preferred exemplary embodiment is described herein, in which the pivot hinge 22 is used to pivotably attach the side air-guiding element 16, it should be noted that the pivot hinge 22 can in principle also be used in other arrangements, for example to pivotably connect an air-guiding element to a vehicle.

A further advantage of the pivot hinge 22 can be that, due to the adjustability of the operating forces, a handle portion integrated in the side air-guiding element 16 can be used to ascend onto the work platform 20 (see FIG. 1) or to descend from the work platform 20. The operating forces can be adjusted so that, when holding onto the handle portion of the side air-guiding element 16 during ascent or descent, the side air-guiding element 16 remains locked in place and does not pivot undesirably. An exemplary embodiment with a handle portion on the side air-guiding element 16 is described below.

FIGS. 1, 2, 4, and 10 show that the side air-guiding element 16 can comprise a handle portion 60.

The handle portion 60 can be disposed on an inner side of the side air-guiding element 16. Expediently, the side air-guiding element 16 comprises an outer shell 62 and an inner shell 64. For example, the outer shell 62 and the inner shell 64 can be fastened to each other at outer end regions by flanges 66 or other fastening means that are bonded or otherwise fastened to each other. The handle portion 60 can expediently be integrated into the inner shell 64 as a vertically extending handle recess.

The handle portion 60 extends parallel to a longitudinal extent of the side air-guiding element 16, and is thus oriented substantially parallel to the pivot axis 30 of the pivot hinges 22. The handle portion 60 is dimensioned and arranged so as to be grasped by a person standing on the ground to facilitate an ascent onto the work platform 20. At the same time, a person standing on the work platform 20 can grasp the handle portion 60 to facilitate a rearward descent.

A special feature of the handle portion 60 is the inclusion of the outer shell 62, which is grasped with the thumb, for example. On the one hand, this allows the adhesive surface connecting the two shells 62, 64 to be pulled through and, on the other hand, improves the ergonomics of the gripping action. Due to the continuous adhesive seam, the handle portion 60 can also be continued, for example, all the way up and down, so that the operator always has a perfect grip, regardless of whether he is standing at the top or bottom of the motor vehicle 10.

For example, in a position of use of the side air-guiding element 16, the handle portion 60 extends over at least a quarter, a third, a half or two thirds of a height of the side air-guiding element 16, in particular starting from a lower end region of the side air-guiding element 16. The handle portion 60 preferably extends over a length of at least 40 cm, 50 cm, 60 cm, 70 cm or 80 cm. Furthermore, the handle portion 60 can also extend over the entire length of the side air-guiding element 16.

FIG. 11 schematically shows how a person can both ascend onto and descend from the work platform 20 by holding onto the handle portion 60 when the side air element 16 is pivoted in.

The invention is not limited to the preferred exemplary embodiments described above. Rather, a large number of variants and modifications are possible which also make use of the inventive concept and therefore fall within the scope of protection. In particular, the invention also claims protection for the subject matter and features of the dependent claims independently of the referenced claims. In particular, the individual features of independent claim 1 are each independently disclosed. Additionally, the features of the dependent claims are also disclosed independently of all of the features of independent claim 1 and, for example, independently of the features relating to the presence and/or configuration of the pivot hinge of independent claim 1. All range indications herein are to be understood as disclosed in such a way that all values falling within the range in question are disclosed individually so to speak, for example, in each case also as preferred narrower outer limits of the range in question.

LIST OF REFERENCE SIGNS

10 motor vehicle
12 driver's cab
14 rear wall
16 (side) air-guiding element
18 media supply
20 work platform
22 pivot hinge
24 tie bracket
26 pivot arm
28 hinge bracket
30 pivot axis
32 locking mechanism
34 first latching element
36 second latching element
38 third latching element
40 fourth latching element
42 spring
44 plain bearing bushing
46 plain bearing bushing
48 seal
50 cover
52 adjustment device
54 pressure spindle
56 threaded bushing
58 stop
60 handle portion
62 outer shell
64 inner shell
66 flange
α pivot angle

The invention claimed is:

1. A device for pivotably connecting an air-guiding element to a vehicle:
   a pivot hinge, which is designed on the one hand to be fastened to the air-guiding element and on the other hand to be fastened to the vehicle,
   wherein the pivot hinge comprises a locking mechanism which is designed to lock the pivot hinge automatically when at least one predetermined pivot position has been reached, wherein the at least one predetermined pivot position has a predetermined pivoted-out position of the pivot hinge or a predetermined pivoted-in position of the pivot hinge.

2. The device as claimed in claim 1, wherein the air-guiding element is flat.

3. The device as claimed in claim 1, wherein the air guiding element is a side air-guiding element at a rear side of a driver's cab.

4. The device as claimed in claim 1, wherein the air guiding element is connected to a vehicle at a rear wall of a driver's cab of a utility vehicle.

5. The device as claimed in claim 1 wherein:
the locking mechanism is integrated in the pivot hinge; or
the locking mechanism is arranged coaxially about a pivot axis of the pivot hinge; or
a pivot axis of the pivot hinge is fully encapsulated or sealed, wherein the locking mechanism partially encapsulates or seals the pivot axis; or
the locking mechanism of the pivot hinge is fully encapsulated or sealed.

6. The device as claimed in claim 1, wherein:
the locking mechanism is formed as a latching mechanism.

7. The device as claimed in claim 6, wherein:
the latching mechanism is designed to be at least double-acting, so that the pivot hinge is lockable in the at least one predetermined pivot position in each case by at least two latching engagements or movable latching elements.

8. The device as claimed in claim 6, wherein:
the latching mechanism comprises a spring for biasing the latching mechanism in the at least one predetermined pivot position.

9. The device as claimed in claim 8, wherein:
the spring brings about or at least assists autonomy of a locking action; or
the spring coaxially surrounds a pivot axis of the pivot hinge.

10. The device as claimed in claim 8, wherein the spring is a helical spring.

11. The device as claimed in claim 6, wherein:
the latching mechanism comprises a fixed first latching element, and a movable second latching element, for engagement with one another.

12. The device as claimed in claim 11, wherein:
latching mechanism comprises a fixed third latching element, and a movable fourth latching element for engagement with one another.

13. The device as claimed in claim 12, wherein the fixed first latching element or the movable second latching element are latching bushings for engagement with one another, or the fixed third latching element or the fourth latching element are latching bushings for engagement with one another.

14. The device as claimed in claim 12, wherein:
the latching elements are arranged coaxially with respect to one another; or
the latching elements coaxially surround a pivot axis of the pivot hinge; or
the latching elements coaxially surround a spring, or a bushing region of the pivot hinge, coaxially surrounds the latching elements; or
the second latching element and the fourth latching element are elastically supported against each other; or
the first latching element and the third latching element are formed as identical parts; or the second latching element and the fourth latching element are formed as identical parts.

15. The device as claimed in claim 1, wherein:
the pivot hinge comprises a hinge bracket for fastening to the vehicle and a pivot arm pivotable relative thereto for fastening to the air-guiding element.

16. The device of claim 15, wherein the hinge bracket supports the pivot arm on an upper side or a lower side of the pivot arm; or
the locking mechanism is configured such that the pivot arm does not perform an axial movement along a pivot axis of the pivot hinge during a locking process.

17. The device as claimed claim 1, wherein:
the pivot hinge comprises an adjustment device for precision adjustment of a pivot arm of the pivot hinge.

18. The device as claimed in claim 17, wherein the adjustment device is a rotatable pressure spindle, or
wherein the adjustment device adjusts the pivot arm to a predetermined position.

19. The device as claimed in claim 1, wherein the pivoted-out position and the pivoted-in position are spaced apart from one another by an angle of at least 40°, 50°, 60°, 70°, 80°, 90° or 100° with respect to a pivot axis of the pivot hinge.

20. The device as claimed in claim 1, wherein:
the device comprises a plurality of pivot hinges provided with the locking mechanism for fastening the air-guiding element to the vehicle in a spaced-apart manner, preferably in a longitudinal direction of the air-guiding element.

21. An air-guiding device for a motor vehicle, said device comprising:
an air-guiding element, and
a pivot hinge, which is designed on the one hand to be fastened to the air-guiding element and on the other hand to be fastened to the vehicle,
wherein the pivot hinge comprises a locking mechanism which is designed to lock the pivot hinge automatically when at least one predetermined pivot position has been reached, wherein the pivot hinge is fastened to the air-guiding element.

22. The air-guiding device of claim 21, wherein:
the motor vehicle is a utility vehicle, or
the air-guiding element is a side air-guiding element at a rear side of a driver's cab; or
the pivot hinge is fastened to an inner side of the air guiding element.

23. The device as claimed in claim 21, wherein:
the air-guiding element comprises a handle portion (60), preferably comprising a handle recess, which is arranged on an inner side or an outer side of the air-guiding element (16).

24. The device as claimed in claim 23 wherein the handle portion is a handle recess, or the wherein the handle portion is integrated on an inner side or an outer side of the air-guiding element.

25. The device as claimed in claim 24, wherein:
the handle portion is oriented parallel to a pivot axis of the at least one pivot hinge; or
in a position of use of the air-guiding element the handle portion extends over at least a quarter, a third, a half, or two-thirds of a height of the air-guiding element; or
the handle portion (60) extends over a length of at least 40 cm, 50 cm, 60 cm, 70 cm, or 80 cm in a use position of the air-guiding element.

26. A motor vehicle, comprising:
an air-guiding element, and a pivot hinge, which is designed on the one hand to be fastened to the air-guiding element and on the other hand to be fastened to the vehicle, wherein the pivot hinge comprises a locking mechanism which is designed to lock the pivot hinge automatically when at least one predetermined pivot position has been reached, wherein the pivot hinge is fastened to the air-guiding element.

\* \* \* \* \*